(12) United States Patent
Shuster

(10) Patent No.: US 9,569,876 B2
(45) Date of Patent: Feb. 14, 2017

(54) ANIMATION CONTROL METHOD FOR MULTIPLE PARTICIPANTS

(76) Inventor: Brian Mark Shuster, Vancouver (CA)

( * ) Notice: Subject to any disclaimer, the term of this patent is extended or adjusted under 35 U.S.C. 154(b) by 1829 days.

(21) Appl. No.: 11/963,765

(22) Filed: Dec. 21, 2007

(65) Prior Publication Data

US 2008/0158232 A1    Jul. 3, 2008

Related U.S. Application Data

(60) Provisional application No. 60/871,446, filed on Dec. 21, 2006.

(51) Int. Cl.
  *G06T 13/40* (2011.01)

(52) U.S. Cl.
  CPC ........ *G06T 13/40* (2013.01); *A63F 2300/6607* (2013.01); *A63F 2300/6623* (2013.01)

(58) Field of Classification Search
  CPC ...................................... G06T 13/40
  USPC ............................... 600/38; 345/474
  See application file for complete search history.

(56) References Cited

U.S. PATENT DOCUMENTS

| | | | |
|---|---|---|---|
| 5,884,029 A * | 3/1999 | Brush et al. ............ | 709/202 |
| 6,072,504 A * | 6/2000 | Segen .................... | 345/474 |
| 6,219,045 B1 | 4/2001 | Leahy et al. | |
| 6,381,444 B1 | 4/2002 | Aggarwal et al. | |
| 6,695,770 B1 * | 2/2004 | Choy et al. ............. | 600/38 |
| 6,767,287 B1 | 7/2004 | McQuaid et al. | |
| 2001/0051989 A1 | 12/2001 | Moncreiff | |
| 2002/0062348 A1 | 5/2002 | Maehiro | |
| 2003/0039945 A1 | 2/2003 | Dang et al. | |
| 2003/0083922 A1 | 5/2003 | Reed | |
| 2003/0139938 A1 | 7/2003 | Meyers | |
| 2003/0151605 A1 | 8/2003 | Dominic | |
| 2004/0015549 A1 | 1/2004 | Saruhashi et al. | |
| 2004/0030781 A1 | 2/2004 | Etesse et al. | |
| 2004/0235564 A1 | 11/2004 | Booth | |
| 2005/0026692 A1 | 2/2005 | Dyl | |
| 2005/0044005 A1 | 2/2005 | Giannini | |
| 2005/0261032 A1 * | 11/2005 | Seo et al. ............... | 455/566 |
| 2006/0089873 A1 | 4/2006 | Stewart, Jr. et al. | |
| 2006/0119598 A1 | 6/2006 | Littlefield | |

(Continued)

FOREIGN PATENT DOCUMENTS

WO    WO 2008/109798    9/2008

OTHER PUBLICATIONS

U.S. Appl. No. 60/189,845, filed Mar. 16, 2000, Harron, et al.

*Primary Examiner* — Phi Hoang
(74) *Attorney, Agent, or Firm* — Sherrie Flynn; Coleman & Horowitt, LLP

(57) ABSTRACT

A computer system is used to host a virtual reality universe process in which multiple avatars are independently controlled in response to client input. The host provides coordinated motion information for defining coordinated movement between designated portions of multiple avatars, and an application responsive to detect conditions triggering a coordinated movement sequence between two or more avatars. During coordinated movement, user commands for controlling avatar movement may be in part used normally and in part ignored or otherwise processed to cause the involved avatars to respond in part to respective client input and in part to predefined coordinated movement information. Thus, users may be assisted with executing coordinated movement between multiple avatars.

17 Claims, 3 Drawing Sheets

(56) References Cited

U.S. PATENT DOCUMENTS

| | | |
|---|---|---|
| 2006/0287072 A1 | 12/2006 | Walker et al. |
| 2007/0011273 A1 | 1/2007 | Greenstein |
| 2007/0038559 A1 | 2/2007 | Jung et al. |
| 2007/0130339 A1 | 6/2007 | Alcorn et al. |
| 2007/0162547 A1 | 7/2007 | Ross |
| 2007/0202484 A1 | 8/2007 | Toombs et al. |
| 2007/0220090 A1 | 9/2007 | Hall |
| 2007/0224585 A1 | 9/2007 | Gerteis et al. |
| 2007/0249323 A1 | 10/2007 | Lee et al. |
| 2007/0255805 A1 | 11/2007 | Beams et al. |
| 2008/0064018 A1 | 3/2008 | Griffin |
| 2008/0081701 A1 | 4/2008 | Shuster |
| 2008/0134056 A1 | 6/2008 | Shuster |
| 2008/0146339 A1* | 6/2008 | Olsen et al. ............... 463/42 |
| 2008/0158232 A1 | 7/2008 | Shuster |

* cited by examiner

ANIMATION CONTROL METHOD FOR MULTIPLE PARTICIPANTS

CROSS-REFERENCE TO RELATED APPLICATION

This application claims priority under 35 U.S.C. §119(e) to provisional application Ser. No. 60/871,446, filed Dec. 21, 2006, which is expressly incorporated by reference herein, in its entirety.

BACKGROUND OF THE INVENTION

1. Field of the Invention

The present invention relates to virtual environments such as used in computer gaming, and in particular for games that simulate an actual 3-D environment and allow for simultaneous participation of multiple players.

2. Description of Related Art

Various simulation games are known in which a 3-D physical world (actual or fantasy) is simulated. Games of this type are sometimes referred to as "virtual reality" or "virtual reality universe" (VRU) games. In known VRU games, an actual or fantasy universe is simulated within a computer memory. Multiple players may participate in a in the game through a computer network, such as a local area network or a wide area network. Each player selects an "avatar," often a three-dimensional figure of a man, woman, or other being, to represent them in the VRU environment. As used herein, "avatar" means an image representing a user in a multi-user virtual reality (VR) space, or VR-like space. Players send inputs to a VRU engine to move their avatars around the VRU environment, and are able to cause interaction between their avatars and objects in the VRU. For example, a player's avatar may interact with an automated entity or person, simulated static objects, or avatars operated by other players.

The VRU may take the form of at least one area or environment which is a virtual-reality three-dimensional map existing in a computer memory, consisting of elements that may include but are not limited to representations of rooms, outdoor areas, exotic environments, objects, people, animals, robots, avatars, robot avatars, time elements, additional spatial elements, and activities. Users establish a presence in the VRU by creating or using an avatar, which is a three-dimensional representative of the user in the VRU, and which can be navigated by the user around various environments in the VRU. A view or views of the VRU are displayed to the user using a client computer display and user interface software as known in the art. Each user provides input to a computer controlling the VRU using an input device connected to a local node or client, which is in turn connected to the networked computer system. The VRU is shared by all players and participants, using elements from the common memory.

Essentially, the computer system generates 3-D, real-time, transient animation of avatars and other objects that includes responses to user inputs, such as move right, left, etc. For example, avatars may be limited to simply observing the environment or area. But usually, avatars can interact with some or all of: other avatars, objects, the environment (e.g., walls, floors, roads, lakes, etc.), and automated or robotic avatars within at least one environment. Interactions by one avatar with any other avatar, object, the environment or automated or robotic avatars may, in some cases, but need not, result in outcomes that may effect or otherwise be observed or experienced by other avatars, objects, the environment, and automated or robotic avatars within the at least one environment of the VRU.

Current VRU's limit the ways in which avatars controlled by different remote players can interact with one another. Each avatar is independently animated by remote operators, and interaction is limited to a sequence of "act-wait-react." After one avatar in an interactive scene acts, such as by speaking or moving, interaction requires processing a response from the other avatar in the scene. Because of lag times introduced by computer systems, and operator reaction time for processing computer input and providing output to a computer interface, interactions via remote avatars proceed more slowly than interactions between natural persons in the same physical space. In addition, current VRU environments are not capable of simulating all sensory inputs that occur in a real environment, and thus, subtle sensory cues that may help guide natural human interactions absent. The lack of some sensory cues, in addition to timing lag, hinders realistic interactions via avatars and may even render practicably impossible many types of complex physical interactions that are readily performed in person.

For example, relatively simple actions such as gestures or unilateral touching may be easily simulated in current VRU environments, but avatars are not able to engage in activities that require coordinated movement in ways that simulate human behavior. For example, it would be very difficult if not impossible for avatars controlled by independent participants to engage in highly coordinated activities such as ballroom dance or team sports. Even a relatively simple coordinated gesture, such as a simulated handshake, requires coordinated movement. The limitations of current VRU spaces and user interfaces make such activities cumbersome and laughable, at best. Nevertheless, many users may desire to observe their chosen avatar engaging in coordinated motion with other avatars. For example, the player who has chosen the Princess avatar may wish to see the Princess waltz with the Prince Charming avatar, or the player who has chosen the star quarterback may wish to execute football plays with his favorite running backs. Therefore, it would be desirable to provide a VRU space that operates to permit coordinated motion of independently-controlled avatars.

SUMMARY

The invention provides a system and method whereby a VRU space may simulate coordinated motion of avatars controlled by independent participants. The coordinated movement may take play in real-time or near real-time, and persons controlling each avatar involved in the animation may independently control their respective avatars at least to a limited degree, such as by initiating or terminating a particular animation sequence. Animation scenes involving avatars controlled by independent operators may comprise transient animation scenes that are not recorded, or may be recorded for subsequent playback. The user interface needed to control avatars during coordinated movement may be the same as used for prior-art VRU's and computer games, for example, a keyboard, mouse or other pointing device, and/or a joystick or other game controller. More advanced motion sensing controllers, such as a motion-sensing hand-held controller, glove or jumpsuit may, in the alternative or in addition, be used to provide input response to the user's bodily motions for the purpose or simulating those motions in the VRU environment.

In an embodiment of the invention, a VRU engine controls at least two animated avatar figures using inputs from different remote clients. Before and after coordinated motion sequences, each client may provide controlling input assigned only to different ones of the avatars. Each avatar may be modeled as a human figure, fantasy creature, animal, or other object with animated components. In an embodiment of the invention, two or more human or humanoid models may used. Each avatar may be modeled with a three-dimensional skin or surface supported by a skeleton and/or modeled body mass. Client inputs may be used to determine character movement. For example, if a user moves a pointing device left, this may initiate a walking movement left. Generally, the VRU engine is supplied with a database, list and/or mathematical engine for providing character motions that may be applied in response to client inputs, which, in turn, may be generated from user inputs. For example, if the VRU engine receives a signal indicating that a controlling user has depressed a "J" key, the VRU engine may access an animation sequence in which the avatar jumps. The jumping motion may be scaled by a factor in response to other input. Meanwhile, another avatar in the scene may also be moved differently in the virtual environment according to input from another user, as received via a client input.

In this embodiment, one or both of the users providing client inputs for control of the avatars may elect to begin a coordinated motion sequence. For example, a first user may ask the second, "Would you like to dance?," to which the second user may respond by sending a command to the VRU engine via a client, indicating that the avatar controlled by the second user should enter a coordinated motion sequence, e.g., a dance sequence, with the first avatar. The coordinated motion sequence may be controlled at least in part by the first client, such that the VRU engine causes both avatars to move in response to input from the first user. For example, the controlling user may directly control only one avatar, while the second avatar is moved in a coordinated way by the VRU engine in response to movement of the first avatar. Optionally, the second user may provide input during the coordinated motion that changes a response mode or otherwise influences actions of the second avatar, while other actions of the second avatar continue to be controlled by the VRU engine in response to inputs from the first user. In addition, or in the alternative, input from both users via separate clients (or a shared client) may control different aspects of the coordinated movement. For example, a first client input may control the lower body (e.g., hips and legs) of a first avatar while a second client input controls the upper body (e.g., torso, arms and head) of a second avatar. The VRU engine may cause the lower body of the second avatar to move in coordination with the lower body of the first avatar, and the upper body of the first avatar to move in coordination with the upper body of the second avatar. Alternatively, the two clients may control different parts of the first avatar, and the entire second avatar may be moved by the VRU engine in coordination with the first avatar. For further example, a first client may control the direction of movement while a second client controls the speed of movement, such as the first client selecting the dance steps and the second client controlling the speed or rhythm of the dance.

In an embodiment of the invention, control of a coordinated motion sequence may be determined by a points system or other classification system indicating what type or degree of control is to be given to each participating client. For example, a user may elect to operate in a "submissive" role, turning over control of designated aspects or all aspects of their avatar to another client or user. Likewise, the number or quality of game points or other objects an avatar possesses may be used to determine how the client controlling the avatar will control a particular coordinated motion sequence. For example, a user whose avatar has earned more "dance points" may be assigned the lead role in a coordinated dance routine.

Various programming methods may be used to implement a coordinated movement module within a VRU environment. In an embodiment of the invention, Movement of a first, lead, or dominant avatar is performed using any suitable avatar control method as described above. Optionally, multiple user inputs to the first avatar may be filtered via a module that accepts inputs from multiple clients and/or users and combines them to obtain a combined single input into the motion of the first avatar. For example, client inputs may be averaged, or different body parts may be controlled by different clients. In the alternative, input from a single client may be used to determine first avatar movement. The VRU engine may further include a coordination module that accepts as input the movement determined for the first avatar and determines an appropriate coordinated motion for the second avatar. Optionally, the coordination module may determine different coordinated motion depending on user preferences, for example, whether a "tango" or "waltz" dance sequence is indicated by one or more clients. Finally, the VRU engine may include animation and rendering modules as known in the art to animate and render the figures involved in the coordinated movement.

A coordinated motion sequence may continue until one or all involved clients signal a desire to end the sequence, until a predetermined time limit has been achieved, until a predetermined event has occurred, until a third client interrupts the coordinated movement, or in response to any other desired trigger. When the coordinated movement sequence is ended, control of the avatars is passed back to the individual clients.

While the foregoing examples involve coordinated motion of two avatars controlled by two independent clients, any number of avatars and clients may interact in a coordinated motion sequence. Coordinated motion sequences according to the invention may include, for example, various types of simulated dances, sports, sexual activities, handshakes and other greetings, and other activities in which simulated coordinated motion of two or more participants is desired.

According to the foregoing, therefore, a VRU coordinated motion system may comprise several elements, including (a) a VRU environment in which avatars are independently controlled by different clients; (b) VRU engine code configured to detect and initiate a coordinated motion sequence involving two or more avatars and associated clients; (c) VRU engine code configured to determine an extent and quality of control assigned to each participating client during the coordinated motion sequence; (d) VRU engine code configured to select and apply movement to a first avatar in accordance with control rules; (e) VRU engine code configured to select and apply coordinated movement to a second or additional avatars coordinated with the movement of the first avatar; and (f) VRU engine code configured to sever control of the second avatar from its controlling client prior to a coordinated motion sequence, and to restore control to the client after the coordinated motion sequence is finished.

Likewise, a method for providing coordinated motion may comprise several steps, including (a) initiating a coordinated motion sequence involving two or more avatars and associated clients or users; (b) determining an extent and quality of control assigned to each participating client or user during the coordinated motion sequence; (c) selecting and applying movement to a first avatar in accordance with control rules; (d) selecting and applying movement to a second or additional avatars coordinated with the movement of the first avatar, and (e) severing client control from one or more avatars prior to coordinated movement, and restoring control after movement is finished.

A more complete understanding of the animation control method for multiple participants will be afforded to those skilled in the art, as well as a realization of additional advantages and objects thereof, by a consideration of the following detailed description of its embodiments. Reference will be made to the appended sheets of drawings which will first be described briefly.

DETAILED DESCRIPTION OF EMBODIMENTS OF THE INVENTION

The disclosed solution to enhance VRU's is a system, apparatus and method for allowing clients dynamically to engage in multi-user coordinated control of multiple avatars in new and useful ways.

Figure 1:
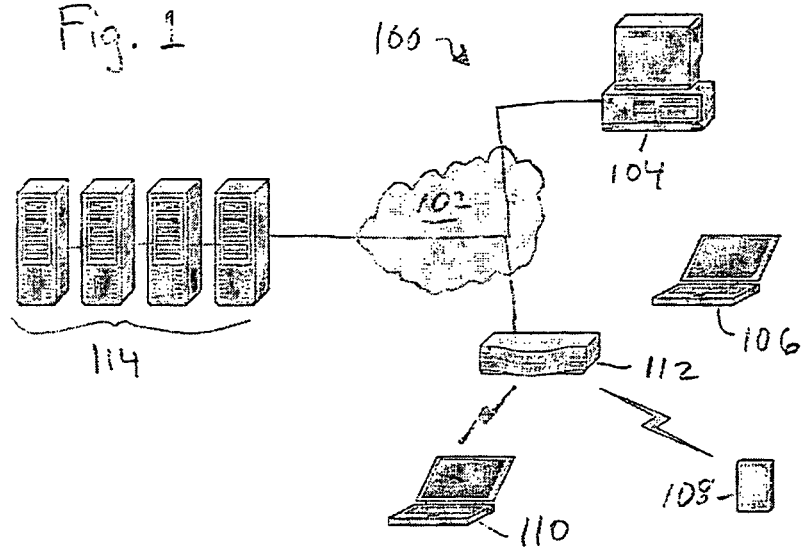
FIG. 1 is a schematic diagram showing a first system according to the invention.

Referring to FIG. 1, a system 100 for providing a VRU to multiple clients may comprise a plurality of client sites, nodes or terminals, for example a personal computer 104, portable computers 106, 110, a compact player, cell phone or digital assistant 108, and/or router 112 communicating via a WAN 102 to one or more servers 114. Servers 114 store and serve game data and software to the client sites. Software or firmware may also be located at each client site, configured to work cooperatively with software or firmware operating on servers 114. Generally, any number of clients may be communicating with servers 114 for game play at any given time.

The VRU computer system 100 is used to control the action of the avatars in response to client input. Client input is generated from user input, i.e., input from a human operator in communication with the client via a user interface device, such as, for example, a keyboard, microphone, motion sensor or sensor array, heat sensor, pointing device, or game controller. Generally, each client input stream is generated from input received by a single user, and the host may track user identities by association with client identifiers present in network communication packet headers, or the like. However, it is also possible for a single client to receive multiple user inputs, and thus, a single client input may represent commands and other input from different clients. In this case, the user input may be tracked at the host using labels or other identifiers embedded by the client into the client input. In addition, a single user may provide input to multiple client devices, resulting in multiple client input streams attributed to a single user or single purported user. This might arise out of operator error or deliberate fraud, or appropriately if specialized user input devices are funneled through different clients, for example, text through a PC client and motion sensor input through a self-contained wireless client device. Methods for handling such errors, variations and permutations may be developed as a matter of system design by one of ordinary skill.

Figure 2:
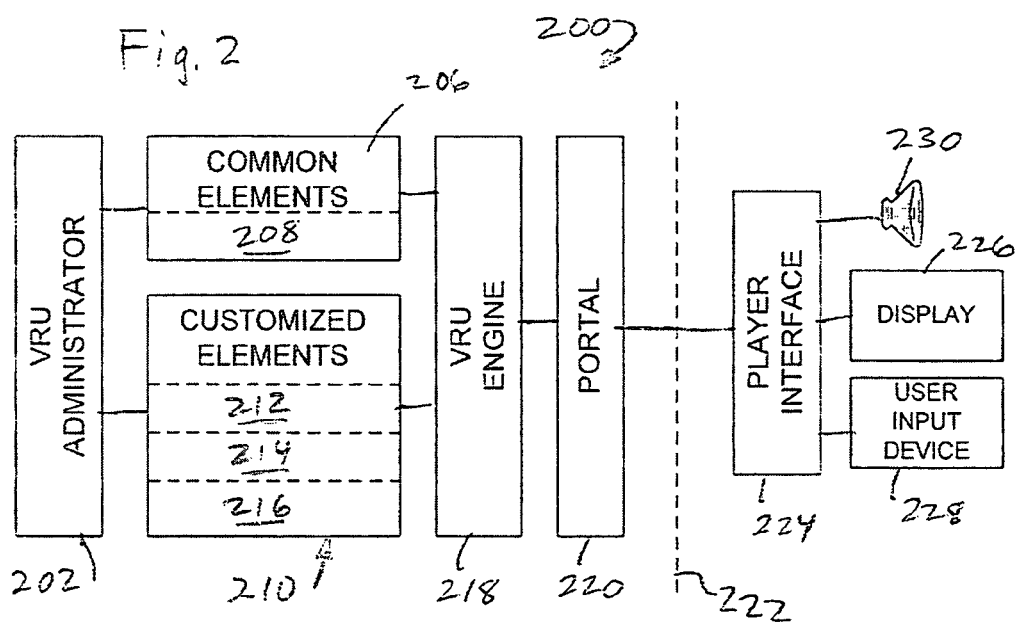
FIG. 2 is a schematic diagram showing a second system according to the invention.

Referring to FIG. 2, a system 200 for providing a VRU according to the invention may be considered to be comprised of server-side components (to the left of dashed line 222) and client-side components (to the right of dashed line 222). Server-side components may comprise a portal 220 for managing connections to multiple simultaneous players. Portal 220 interacts with a VRU engine 218, passing client input from multiple clients to a VRU engine, and passing game data from the VRU engine to respective individual players. VRU engine 218 is operatively associated with two memory spaces, a common memory space 204 holding common elements of the VRU, and a personalized space 210. As known in the art, objects in a VRU are modeled as three-dimensional objects, or two-dimensional objects, having a defined location, orientation, surface, surface texture, and other properties for graphic rendering or game behavior. Common memory space 204 may be considered as comprised of a core area 206 for holding core common elements, and a non-core area 208 for holding non-core common elements 208. Personalized space 210 may be comprised of various different personal areas 212, 214, 216, each assigned to a different client or user.

Data concerning avatars may comprise both common memory and personalized memory elements. In an embodiment of the invention, each user may customize an avatar to have an appearance and qualities specified by the user, by choosing avatar characters, features, clothing and/or accessories from an online catalog or store. The particular arrangement selected by a user may reside in a personalized space for each user, specifying which avatar elements are to be drawn from a common space to construct an avatar. In an embodiment of the invention, a customized avatar instance may be stored in a personalized space for the user. In the alternative, or in addition, a user may own customized elements of an avatar, including modeled clothing, accessories, simulated physical powers, etc., that are stored solely in the personalized space and are not available to other users. Avatars may move and interact both with common elements and personalized elements.

A separate administration module 202 may operate at the server level to create, update, modify or otherwise control the content of the VRU as defined in the memory areas 204 and 210. Generally, changes in the personal space area 210 are driven by individual users, either through the VRU administrator 202 or another module. Control of common areas, i.e., the game environment and the objects in it, may be via the administrator module 202.

At the client level, a player interface module 224 may be installed to receive player inputs from one or more user input devices, such as a keyboard, mouse or other pointer, or microphone, and provide data to the VRU engine 218 via portal 222 in response to the input. The player interface module may also receive game data from portal 220 and process the data for display on display 226 and/or for audio output on speaker 230. Various systems and methods for providing a three-dimensional, multiplayer interactive animation to multiple players are known in the art, or may be adapted by one of ordinary skill for use with the invention. The invention is not limited to a particular hardware or software architecture for carrying out the steps described herein.

In an embodiment of the invention, a user may define an avatar to be created for them by responding to questions, filling out a form, making a request via a form or robot avatar, making a specific request to a live person or salesperson, clicking on one or more results from a search, creating a user-profile, having a user profile created from their past behavior, having a user profile created from their prior searches, having a user profile created based on their prior responses to questions or forms, or generally making a specific request by any method. Based on the information supplied by or deduced about the user, the system that presents the user with the VRU may provide a customized avatar that comports to the specific request or interest of the user. This avatar may be unique for the user, or it may be one of numerous already-created avatars that best suit the user's preference, or it may be a dynamically created avatar that is neither already-created nor unique for the user.

In an embodiment of the invention, a VRU memory space 212 may be defined that is associated with a user ID or client ID. The VRU memory space may be used to hold elements of an avatar that are personalized for the user or client, or identifiers for selected common components arranged in a personalized manner. In the alternative, the space may hold an entire personalized avatar. When a user logs on, the computer system may access the personalized VRU memory to generate an avatar for the user, and may also access a general or public VRU memory 204 that includes elements of the VRU that are public or available to other users. Likewise, for an unregistered user these elements may be linked to an ID for the requesting client, populated initially by default or host-selected elements. The user's avatar may be generated by combining elements of the personalized VRU and the public VRU in any desired manner, according to the set of predefined rules. For example, the elements from the personalized VRU 212 may be added to a public VRU 206, 208 to create a customized avatar. In the alternative, personalized VRU elements may be used to modify or replace avatar elements in the public space 206, 208.

Figure 3:
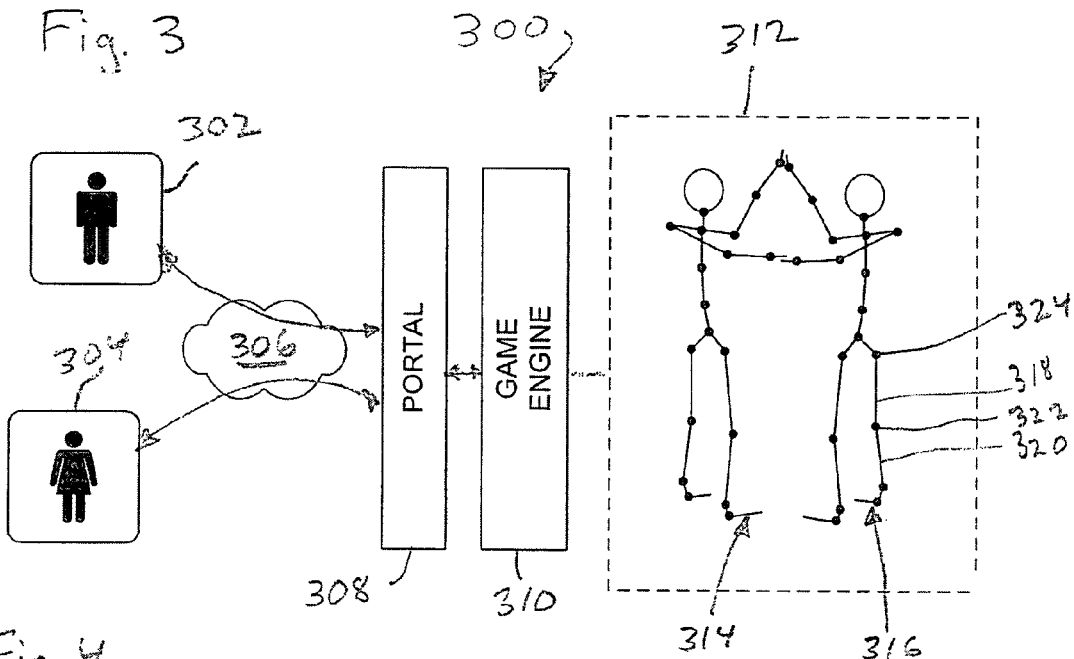
FIG. 3 is a schematic diagram showing aspects of a coordinated avatar animation system.

FIG. 3 shows an exemplary system 300 configured for providing coordinated avatar motion in a VRU space. System 300 comprises a portal 308 in operative association with a VRU engine 310. Multiple different remote clients 302, 304 may be in communication with the VRU engine via portal 308 and wide area network 308. VRU engine 310 may perform multiple functions used in providing a VRU environment to multiple remote clients. One of these functions may include animating one or more avatars. Each of the avatars may represent and be controlled by a different one of remote clients 302, 304.

An animation module of the VRU engine may control avatar motion. Avatars may be modeled using digital armatures 314, 316. Each armature may comprise a collection of body elements, e.g., elements 318, 320, related by joints, e.g., 322, 324, and various animation variables. While the body elements are shown as simple lines 312, it should be appreciated that body elements may comprise other geometric or modeled physical elements, for example, polygons, curves, and modeled mass.

Characteristic modeled motion of the digital armature may result in characteristic simulated motion by an avatar controlled by the armature, for example, walking, running, and jumping. For example, a remote client 304 may send a command for the client's avatar to walk left. The VRU engine may apply a predetermined walking motion to the armature 316 while moving it to the left in the VRU environment. The walking motion may comprise a repeated cycle of foot, leg and body movement of a digital armature. The animation module may calculate or look up in a data table a relative position of each body element for each frame of an animated sequence. An armature may be used to position avatar components during each frame of the animated sequence. Various different methods may be used to animate an avatar in the VRU environment.

In an embodiment of the invention, various different animation sequences may be stored for 3-D models of different avatars. Avatars may be provided in a limited number of different sizes and proportions, and animations sequences prepared in advance and stored for different motions of each avatar type. The VRU engine may select and "play" an appropriate sequence in response to client commands, over which a texture or avatar skin/clothing and accessories may be applied. In this embodiment, a digital armature may be used in production of animation data for use in a VRU environment, but not during live gaming.

Regardless of how animated motion of an avatar is generated, the VRU engine may function to position and orient the avatar in the VRU environment, based on an initial avatar position and orientation and subsequent movement. During a coordinated motion sequence, the VRU engine may operate to coordinate the motion, position, and orientation of two or more avatars controlled by two different clients 302, 304. For example, two clients 302, 304 may provide commands indicating that they would like their respective avatars to execute a coordinated motion sequence, such as, for example, a handshake and/or hand slap.

In an embodiment of the invention, therefore, after receiving the request or coordinated motion, the VRU engine may cause each of the avatars 314, 316 to move to a position for executing the requested coordinated motion maneuver. Then, the VRU engine may cause each avatar to execute a motion sequence calculated to achieve the desired result, such as, for example, a clasping of hands or slapping of hands. In the alternative, or in addition, one or both clients 302, 304 may provide input to the coordinated motion. The clients 302, 304 may each view the coordinated motion sequence from their respective viewpoints in the VRU.

It should be apparent that various methods may be used to provide final rendered scenes at the client computers. For example, a final rendered scene may be prepared at a central server and provided to remote clients and graphics data ready for display using suitable display software. In embodiments of the invention, some or all rendering operations may be performed at the remote clients, using underlying scene geometry and object models provided from a VRU server. In either embodiment, the VRU engine may provide data for each frame or selected key frames, or provide differential data only. Differential data may be limited to the differences between a transmitted frame and a succeeding frame or key frame.

Figure 4:
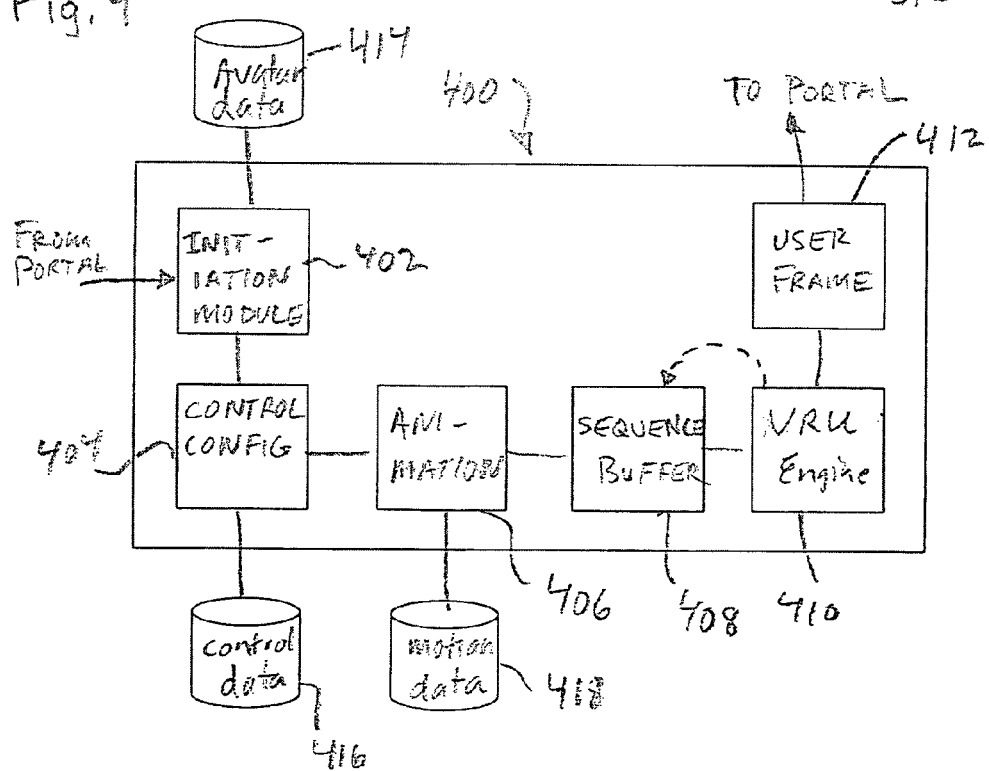
FIG. 4 is a schematic diagram showing aspects of a coordinated avatar animation system.

FIG. 4 is a schematic diagram showing aspects of a coordinated avatar animation system 400. System 400 may be implemented, for example, using hardware and/or software located at a remote server computer or bank of coordinated computers. A VRU portal (not shown) may handle incoming data from remote clients and pass the data to an initiation module 402 of the animation system. A primary function of the initiation module may be to monitor input streams from multiple clients to detect an event that triggers a coordinated motion sequence for two or more avatars controlled by different clients. A triggering event may occur whenever predetermined conditions for initiating a motion control sequence have occurred. Such conditions may include, for example, two or more clients signaling that both agree to initiate coordinated motion, the presence of two or more avatars in an area configured for coordinated motion, or near an object that triggers coordinated motion, or a signal from a first client indicating a desire to engage in coordinated motion with a nearby avatar belonging to a second client who, for various reasons may be treated as submissive to the first client.

To determine whether a triggering event has occurred, the initiation module 402 may monitor both incoming command streams from clients and/or user accounts, and avatar/user data from an avatar database 414. Avatar data may comprise transient data such as current position and orientation of one or more avatars, and more permanent data such as an avatars' gender, size, preferences, accessories, or other characteristics. The initiation module may also consider data such as a user's rank or number of game points accumulated by a user, which may be used to determine, for example, whether or not a client is qualified to participate in a coordinated motion sequence, or the degree and quality of control a client may have during a coordinated motion sequence. A further function of the initiation module 402 may be to identify avatars and clients to be involved in a triggered coordinated movement sequence, and to characterize the respective roles of each. When no triggering event is detected, the VRU engine may operate avatars in the VRU in a normal fashion; i.e., without coordinated movement.

Once a triggering event has been detected, system 400 may configure a control stream for the coordinated movement. One of the features and benefits the system may provide includes the ability for one or more clients to control one or more avatars during coordinated movement, such that the avatar motion, although coordinated, is not predetermined. A user-generated control stream originating from one or more remote clients may be passed to an animation engine to determine the output of the coordinated motion. At the same time, however, some aspects of the coordinated motion may be completely predetermined by non-user data originating form the host layer, such as a predetermined motion sequence. Accordingly, a control configuration module 404 may be used to process client input and provide a control input to an animation engine 406.

To do so, the control configuration module may access a database of control data 416, which may include rules for prioritizing and combining client input. This may be performed in various suitable ways. In an embodiment of the invention, the control configuration module may receive data from an initiation module indicating an identity of the clients or users to be involved in a coordinated motion sequence, their avatars, and the type of coordinated motion desired. Such data may also include a ranking or role that each avatar is to perform. The configuration module may use this data to look up a control schema in a control database. A control schema may provide rules for combining particular user input with predetermined control input. For example, initial data may indicate two avatars are to waltz, with one avatar as the lead. By looking up "waltz" in a control table, it may be determined that the "lead" avatar controls the direction the two avatars waltz, while the second avatar determines when waltz is over. Both players control facial expressions for their own avatars, and the speed of the waltz may be determined from the sum of inputs from both clients. The control configuration module may then execute this applicable rule, processing client inputs during the waltz to provide input to an animation module 406.

Actual animation of avatars moving in a coordinated way may be performed by an animation module 406, which may draw on a library of motion data 418 to drive avatars in coordinated motion. In addition, the animation module may receive processed client input from control module 404. Continuing the example of a coordinated waltz, a motion database 418 may include an animation loop for digital armatures of two avatars, with direction, speed, termination point and facial expressions to be driven by client input and other motions predetermined. The control configuration module 404 may then process client input to provide a combined input to the animation module, which may generate the motion on a frame-by-frame basis.

Animation module 406 may calculate positions of digital armatures for the avatars for each frame of a motion sequence. Resulting armature positions may be placed into a sequence buffer 408. The animation module may adjust its position calculations to account for changes in client input after each frame, after a certain number of frames, or when ever a change in client input occurs. A VRU engine 410 may draw from the sequence buffer to generate animation frames or data 412 to be provided to the remote clients.

Figure 5:
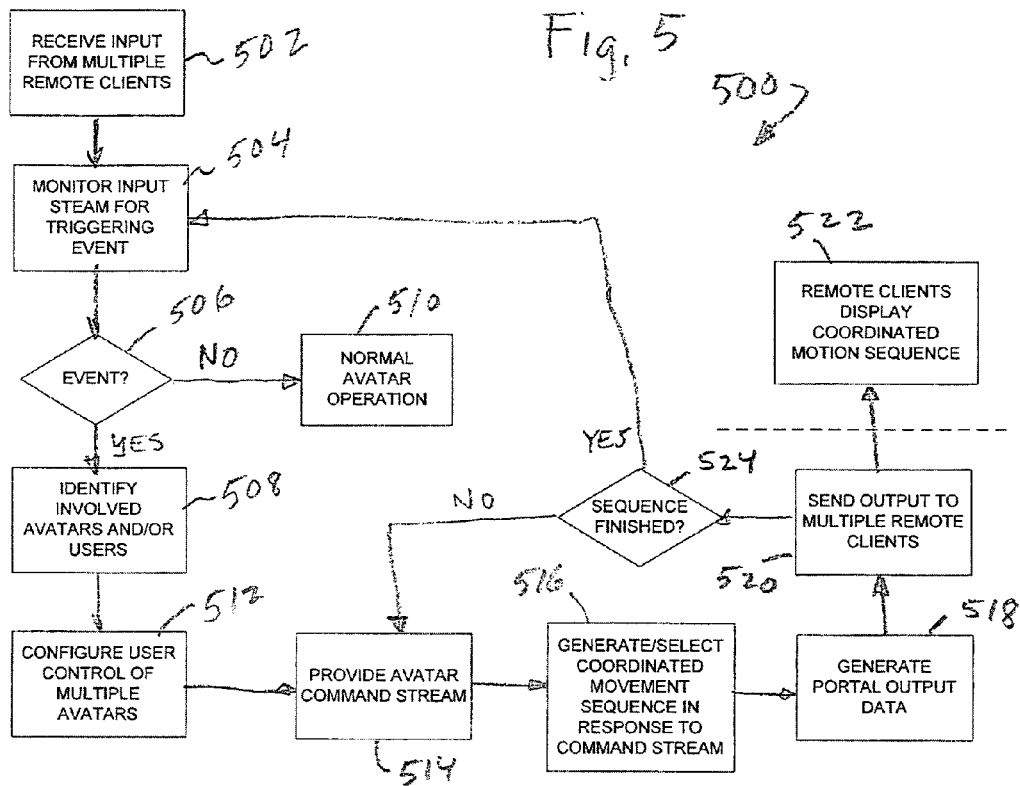
FIG. 5 is a flow diagram showing exemplary steps of a method for coordinated avatar animation according to the invention.

FIG. 5 is a flow diagram showing exemplary steps of a method 500 for providing coordinated avatar animation to a plurality of users or clients. At step 502, input may be received from multiple remote clients, such as via a portal. At step 504, an input stream from multiple remote clients may be monitored by a monitoring component upstream of the portal to detect a triggering event. A triggering event may include any event that is designed to initiate a sequence of coordinated movement. Most commonly, such triggers may comprise express or implied agreements between users for coordinated motion of avatars. Exemplary triggering events are described herein above. As indicated at 506, if no triggering event is detected, normal avatar operation may continue in the VRU engine as indicated at step 510. Normal operation may include, for example, operation in which each client controls the motion of its own avatar, although avatars may "contact" one another and thereby influence one another's position and movement.

If a triggering event is detected, at step 508, the avatars and/or clients to participate in a coordinated motion sequence may be identified by a component of the VRU engine. The type of coordinated motion to be performed, and the role of each avatar, may also be identified or defined. At step 512, a client control stream for control of multiple avatars may be configured using a configuration module interoperable with the control module. This may include determining which client inputs to be filtered out or discarded, a manner of combining client input, and what input does, and does not, need to be provided. An appropriate filter or process may then be activated to process input from multiple clients used in the animation control. This process may be applied at step 514 to process client input and provide a control stream to an animation process 516.

In an embodiment of the invention, a user or client may be designated as dominant and may take control, to a greater or lesser extent, of the other client's avatar. The control configuration step 514 may be configured so as to allow the controlling or dominant client to change during the animation process. In effect, the clients may trade places as dominant/submissive or leader/follower during an animation sequence, if desired.

At step 516, an animation engine may generate and/or select movement of the involved avatars using algorithms for generating motion, the client control stream, and/or tables of motion sequences. The movement may be provided as resulting positions in a sequence of frames, or as differential movement. At step 518, the resulting animation showing coordinated movement of multiple avatars may be used to generate a scene for portal output, according to any suitable process. The portal output may then be provided to multiple remote clients at step 520, such as over a wide area network, or via a wireless cellular network, or any other system for communicating data to remote clients. At step 522, multiple remote clients may display the resulting coordinated motion sequence using local hardware and software for display.

As indicated at 524, an animation sequence may continue as a loop between steps 514-520, until the sequence is terminated or finished. After completion of the sequence, a process of monitoring the input stream to detect a triggering event may resume for the two or more avatars involved in the coordinated movement. For avatars not involved in coordinated movement, monitoring as indicated at step 504 may continue during coordinated movement involving other avatars.

Figure 6:
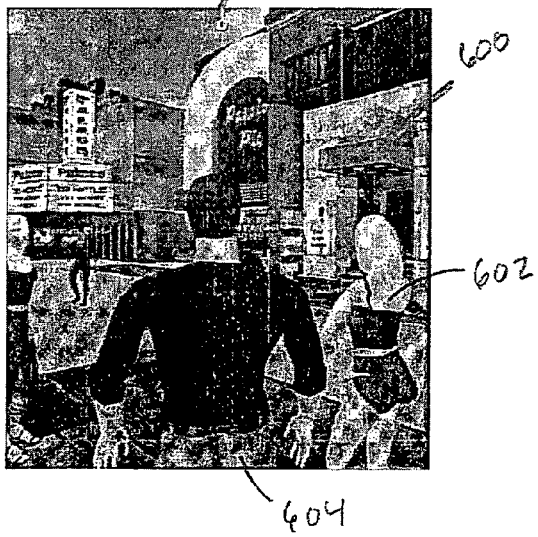
FIG. 6 is an exemplary view of a VRU with avatars, as it might appear to remote clients.

FIG. 6 shows an exemplary common scene 600 containing multiple avatars, e.g., avatars 602, 604. Each avatar is controlled by a different player via a remote interface. The common scene 600 appears to be the same for each avatar. However, each player may select a different viewpoint of the scene, so the rendered view of the scene may be different for different players. Scene 600 includes multiple storefronts, such as storefront 606, that may serve as portals to common spaces, personalizable spaces, or some combination of the foregoing. Avatars 602, 604 may engage in coordinated movement within any desired 3-D scene.

Figure 7:
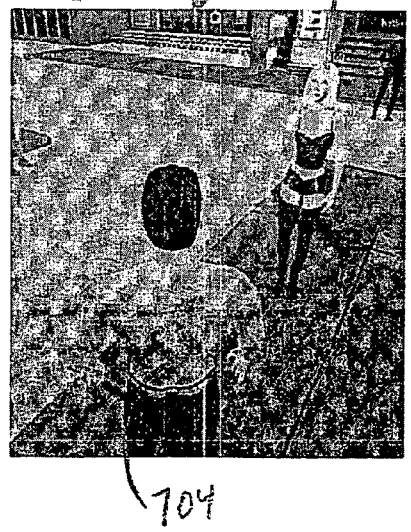
FIG. 7 is an exemplary view of a VRU with avatars about to initiate a coordinated motion sequence, as it might appear to remote clients.

FIG. 7 shows another exemplary common scene 700 including a first avatar 702 positioned for interaction with a second avatar 704. Interaction may include, for example, audio chatting, text chatting, and simulated physical interaction. In general, avatars behave as non-core common elements, in that each avatar has a customizable appearance that can be defined or modified by individual players, but is otherwise an object that is visible in the common areas and interacts with other players according to predefined rules. Non-coordinated interaction may preface episodes of coordinated movement, as clients may negotiate roles to play during coordinated movement, and/or play games of skill or chance to determine their respective roles. As used herein, coordinated movement of avatars does not include motion in which each client is in full control of the movement of his or her avatar, which moves independently.

It should be apparent that a wide variety of coordinated motions may be simulated in a VRU using the methods and systems described herein. Simulated activities that involve coordinated movement between avatars may include, for example dancing, social gestures such as handshakes and hugs, yoga massage, team sports of all kinds, sexual activity, and hand crafting of various objects. A wide variety of coordinated movement sequences may be developed and applied in a VRU environment to simulate any desired cooperative motion or position to enhance the richness and value of the VRU environment for the end user.

Having thus described embodiments of a method and system for providing coordinated motion of avatars in a multi-user environment, it should be apparent to those skilled in the art that certain advantages of the within system have been achieved. It should also be appreciated that various modifications, adaptations, and alternative embodiments thereof may be made within the scope and spirit of the present invention. For example, a system operable over a wide area network has been illustrated, but it should be apparent that the inventive concepts described above would be equally applicable to systems operating over other networks.

What is claimed is:

1. A method of managing a computer-implemented animation process for multiple participants, comprising:
    animating motion of respective ones of modeled avatars in a modeled VRU environment each independently responsive to respective ones of multiple separate command streams provided by separate clients to a host computer;
    initiating a coordinated motion sequence at the host involving the modeled avatars, wherein the coordinated motion sequence simulates voluntary cooperative movements of the avatars in response to a selected one of the multiple separate command streams;
    animating the coordinated motion sequence for the modeled avatars to provide animation data, wherein the selected one of the multiple separate command streams simultaneously controls voluntary movements of at least two respective ones of modeled avatars during the coordinated motion sequence that, prior to initiating the coordinated motion sequence were independently controlled by different ones of the multiple separate command streams; and
    providing animation data for display of an animated scene depicting the coordinated movement.

2. The method of claim 1, further comprising animating the coordinated motion in part according to predefined coordinated motion information defining motion of one or more of the modeled avatars in relation to motion of a lead one of the modeled avatars.

3. The method of claim 1, further comprising configuring control of the coordinated motion sequence at the host with reference to predefined rules for prioritizing and combining the multiple separate command streams.

4. The method of claim 1, wherein initiating the coordinated motion sequence is performed in response to detecting a triggering event indicative of an agreement to perform the coordinated motion sequence between at least two users associated with different ones of the multiple separate command streams.

5. The method of claim 1, further comprising animating the coordinated motion using characteristic digital armature movement data for defined avatar actions selected from the groups consisting of: social gestures, actions performed for games of sport, dance, and sexual activity.

6. The method of claim 5, further comprising modeling movement of the first avatar and the second avatar for the coordinated movement scene according to a predefined rule set for generating movement of the second avatar coordinated with movement of the first avatar simulating the voluntary cooperative movements.

7. The method of claim 5, further comprising, responsive to selection input from one of the first client and second client, selecting the predefined rule set from a plurality of rule sets each defining a different coordinated motion relationship.

8. The method of claim 7, further comprising selecting the plurality of rule sets including rule sets for simulated sexual activity.

9. The method of claim 7, further comprising selecting the plurality of rule sets including rule sets for simulated sports.

10. In a computer-generated virtual reality process, a method for coordinating motions of a first avatar and a second avatar; the method comprising:

processing, at a computer host, a first input stream from a first client for controlling first modeled motions of a corresponding first avatar and an independent second input stream from a second client for controlling second modeled motions of a corresponding second avatar independently of the first avatar, prior to initiation of a coordinated movement scene;

upon initiation of a coordinated movement scene involving the first avatar and the second avatar, designating at the host a first control function for the first input stream and a second control function for the second input stream, wherein the first control function includes simultaneous control of selected voluntary cooperative movements for the first avatar and the second avatar, and the second control function includes control of other movement not included in the selected voluntary cooperative movements for at least the second avatar contemporaneously with the first control function;

modeling movement of the first avatar and the second avatar for the coordinated movement scene according to the first control function responsive to the first input stream and according to the second control function responsive the second input stream to provide scene output data; and providing the scene output data for display of the coordinated movement scene.

11. A computer-implemented method for providing coordinated avatar animation to a plurality of clients, comprising:

receiving client input from multiple remote clients;

configuring a client control stream for control of a plurality of avatars to process the client input and provide a control stream to an animation process in which client input received from a first client temporarily controls, at least in part, voluntary cooperative movements of an avatar normally controlled using client input received from a second client only;

generating, in the animation process, modeled movement of the plurality of avatars using the control stream; and generating a scene for portal output to respective ones of the multiple remote clients.

12. The method of claim 11, further comprising monitoring the client input to detect a triggering event for initiating a coordinated motion sequence as a condition precedent to configuring the client control stream.

13. The method of claim 12, further comprising, if no triggering event is detected, continuing normal avatar operation in which input from each client controls motion of a respective one of the plurality of avatars.

14. The method of claim 11, further comprising resuming normal avatar operation in which input from each client controls motion of a respective one of the plurality of avatars after completion of a temporary period for performance of generating modeled movement of the plurality of avatars using the control stream.

15. The method of claim 11, further comprising generating modeled movement of the plurality of avatars using a defined motion sequence for animating a digital armature in addition to the control stream.

16. The method of claim 15, further comprising changing the defined motion sequence in response to user input indicating selection of a different sequence for animating a different action.

17. The method of claim 11, further comprising generating modeled movement of the plurality of avatars using predefined coordinated relationship between a dominant avatar and a submissive avatar in addition to the control stream.

\* \* \* \* \*